Patented Sept. 29, 1936

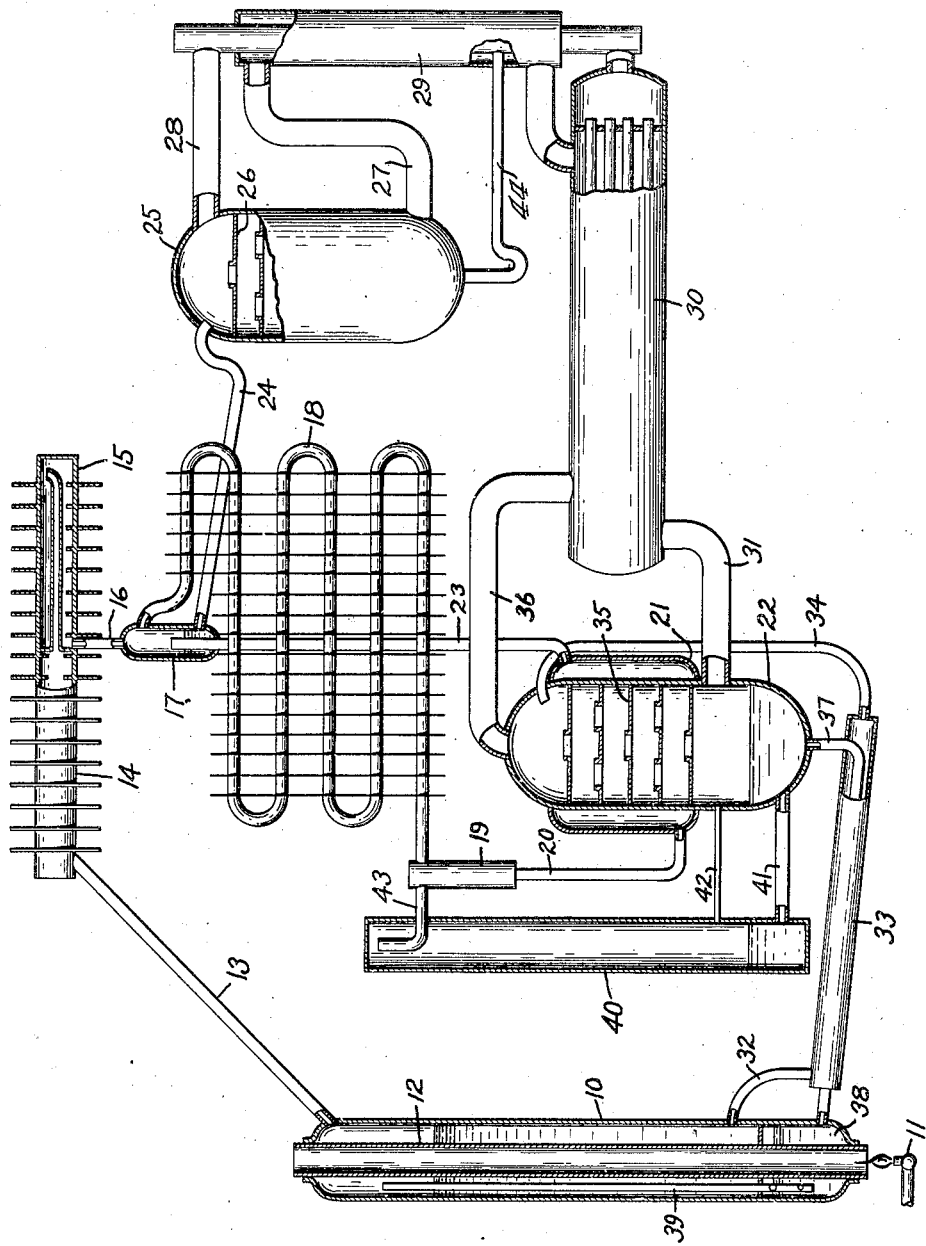

2,055,856

UNITED STATES PATENT OFFICE 2,055,856

ABSORPTION TYPE REFRIGERATING SYSTEM

Harry K. Bergholm, Larchmont, N. Y., assignor, by mesne assignments, to Servel, Inc., Dover, Del., a corporation of Delaware Application December 21, 1932, Serial No. 648,158

15 Claims. (Cl. 62—119.5)

This invention relates to absorption refrigerating systems of the pressure equalized type in which circulates an inert auxiliary agent, and more particularly a system of this type cooled by air.

Briefly, in this type of refrigerating system an auxiliary agent such as hydrogen is circulated between an evaporator and absorber. Liquid cooling fluid (or refrigerant or cooling agent) such as ammonia is evaporated into the hydrogen by diffusion in the evaporator and absorbed from the resulting gas mixture into water solution in the absorber. The solution is circulated between the absorber and a generator from which latter the ammonia is expelled from solution by heat, the expelled ammonia being liquefied in the condenser and returned to the evaporator.

It has previously been proposed to provide in an air cooled refrigerating system of the above type, a storage vessel in the condenser vent line for excess auxiliary pressure equalizing fluid, commonly referred to as a pressure vessel. Upon rise in temperature of the cooling air, auxiliary fluid is displaced by cooling fluid or refrigerant vapor from the pressure vessel into the active gas circuit thereby increasing the pressure in the latter. With such an arrangement the total pressure in the system varies with the air temperature thereby allowing maximum efficiencies under normal operating conditions. It has also been proposed to automatically vary the capacity of such a refrigerating system by trapping cooling fluid out of circulation to vary the average concentration of absorption solution responsive to the load.

In accordance with this invention both the pressure in the system and the solution concentration are varied simultaneously responsive to the cooling of the condenser.

Other objects and advantages will be apparent from the following description taken in connection with the accompanying drawing in which the figure shows schematically, with parts in vertical section, an absorption refrigerating system of the pressure equalized type embodying the invention.

Referring to the drawing, a generator 10 containing a liquid solution of cooling fluid, such as a water solution of ammonia, is heated by a burner 11 directed into a flue 12. Ammonia vapor expelled from solution by heat in the generator passes through conduit 13, through a high temperature rectifier 14 and then a low temperature rectifier 15. In these rectifiers water vapor condenses out of the ammonia and flows back to the generator through conduit 13. From rectifier 15 ammonia vapor and any liquid ammonia formed by condensation flows through conduit 16 into a separating vessel 17. From the latter the ammonia vapor passes into an air cooled condenser 18 in which the vapor is liquefied by condensation, the liquid draining through a trap 19 and conduit 20 into a cooling jacket 21 around the absorber 22.

In jacket 21 some of the liquid is vaporized by transfer of heat from the absorber 22 and the vapor raises liquid through a thermosyphon conduit 23 into the separating vessel 17. From the latter the lifting vapor again passes into the condenser 18 and the raised liquid accumulates, together with liquid from the rectifier 15, in the lower part from where it overflows through conduit 24 into the evaporator 25.

In the evaporator the liquid ammonia flows downwardly over baffle plates 26, evaporating by diffusion into an auxiliary agent such as hydrogen which enters the evaporator through conduit 27. The resulting gas mixture flows from the evaporator through conduit 28, a vertical gas heat exchanger 29, a horizontal gas heat exchanger 30, and conduit 31 into the absorber 22.

Weak absorption liquid flows from the generator 10 through conduit 32, liquid heat exchanger 33, and conduit 34 into the upper part of the absorber 22 where it flows downwardly over baffle plates 35 absorbing ammonia from the gas mixture. The hydrogen or weak gas, from which ammonia has been absorbed, flows from the upper part of the absorber through conduit 36, the horizontal gas heat exchanger 30, vertical gas heat exchanger 29, and conduit 27 back to the evaporator 25. Enriched absorption liquid accumulates in the lower part of the absorber from where it flows in conduit 37 through the liquid heat exchanger 33 to a chamber 38 which is heated by the burner 11 directed into flue 12, in the same manner as the generator 10. Vapor expelled from solution in chamber 38 raises liquid therefrom through a thermosyphon conduit 39 into the generator 10.

A drain connection 44 is made from the lower part of the evaporator to the gas heat exchanger 29 for return to the liquid circuit of unevaporated liquid by way of the gas heat exchanger and conduit 31 into the absorber 22. Circulation of the hydrogen between the evaporator and absorber in the direction previously described is due to the greater weight of the column of rich gas with respect to the column of weak gas. On starting, the gas may tend to flow downwardly in the evaporator due to the evaporation of ammonia therein but flow in this direction will be opposed by the tendency of weak gas to rise in the absorber, and the flow will be reversed by the evaporation of ammonia introduced into the gas heat exchanger 29 from the drain 44.

In accordance with this invention there is provided a pressure vessel 40 having a static or non-circulating connection 41 to the liquid space in the lower part of the absorber 22 so that absorption solution stands in the lower part of vessel 40 to the same level as in the absorber. A small vent 42 is provided between the absorber and vessel 40 above the liquid level therein. The condenser 18 is vented into the upper end of vessel 40 through a conduit 43.

Upon sufficient rise of air temperature, uncondensed ammonia vapor flows from the condenser through the vent 43 into the pressure vessel 40 and the partial pressure of ammonia in the latter increases, displacing hydrogen into the absorber, thus creating a higher total pressure in the system. Since the pressure vessel 40 is also cooled by air, it functions, under increased air temperature conditions, as a continuation of the condenser and the ammonia vapor liquefies on the walls and flows downwardly into the solution in the lower part thereof, thus strengthening this solution while the active solution in the system becomes weaker. In this manner, at high air temperatures, the charge in the system is automatically changed to higher pressure and weaker solution with correspondingly greater maximum capacity.

When the temperature of the air decreases and the ammonia vapor is again all liquefied in the condenser, the solutions in the absorber and the pressure vessel equalize by diffusion through the static connection 41 and the total pressure in the system again decreases to normal due to decrease in partial pressure of ammonia in the pressure vessel 40.

It will be obvious to those skilled in the art that various other changes may be made in the construction and arrangement of parts without departing from the spirit of the invention and therefore the invention is not limited to what is shown in the drawing and described in the specification but only as indicated in the appended claims.

I claim:

1. In the method of refrigeration comprising circulation of heat conducting fluid and evaporation thereof into an auxiliary agent, absorption thereof into liquid solution, expulsion thereof from said solution, and condensation thereof to liquid, that improvement which consists in storing an excess of said auxiliary agent, and simultaneously increasing the quantity of active auxiliary agent from said stored excess and decreasing the average concentration of said solution by trapping heat conducting fluid in liquid phase from circulation.

2. Refrigerating apparatus comprising a generator, condenser, evaporator, and absorber interconnected for the circulation of cooling fluid therethrough in series and circulation of an auxiliary agent between said evaporator and absorber, means for storing an excess quantity of said auxiliary agent, and means for simultaneously increasing the quantity of circulating auxiliary agent from said excess and removing cooling fluid in liquid phase from circulation.

3. In the method of refrigeration comprising continuous circulation of heat conducting fluid and evaporation thereof into an auxiliary agent, absorption thereof into liquid solution, expulsion thereof from said solution, and condensation thereof to liquid by heat transfer to ambient air, that improvement which consists in trapping a portion of said heat conducting fluid in liquid phase out of circulation upon increase in temperature of the air.

4. Refrigerating apparatus comprising a generator, a condenser, an evaporator, an absorber, connections forming a circuit for circulation of a cooling fluid through said parts and forming a circuit for circulation of absorption solution between said generator and absorber and forming a circuit for circulation of an auxiliary agent between said evaporator and absorber, a closed vessel outside the circulation circuit for absorption liquid having a static connection to the absorption solution circuit so as to store in the lower part thereof a substantially static quantity of solution, and a vent from said condenser to the auxiliary agent circuit including that portion of said vessel above the liquid level therein.

5. Refrigerating apparatus comprising a generator, a condenser, an evaporator, an absorber, connections forming a circuit for circulation of a cooling fluid through said parts and forming a circuit for circulation of absorption solution between said generator and absorber and forming a circuit for circulation of an auxiliary agent between said evaporator and absorber, a closed vessel outside the circulation circuit for absorption liquid having a static connection for liquid from the lower part thereof to the circuit for absorption solution, a conduit from said vessel above the liquid level therein to the circuit for the auxiliary agent, and a vent from said condenser into said vessel.

6. Refrigerating apparatus comprising a generator, an air cooled condenser, an evaporator, an absorber, connections forming a circuit for circulation of a cooling fluid through said parts and forming a circuit for circulation of absorption solution between said generator and absorber and forming a circuit for circulation of an auxiliary agent between said evaporator and absorber, a closed vessel outside the circulation circuit for absorption liquid having restricted communication with said absorber to contain absorption solution at the same level as in the latter, a connection between said vessel and absorber above the liquid level, and a vent from said condenser into said vessel.

7. Method of producing refrigeration through the agency of an absorption system which includes expelling a cooling agent from solution in an absorption liquid, converting the cooling agent to liquid phase, evaporating the cooling agent in the presence of an auxiliary agent, absorbing the cooling agent in the absorption liquid, circulating the auxiliary agent between the place of evaporation and the place of absorption, circulating the absorption liquid between the place of absorption and the place of expelling, and automatically varying the relative proportions of circulating fluids by withdrawing cooling agent from the path of flow from the place of expelling to the place of evaporation and accumulating said withdrawn cooling agent in liquid phase, and by accumulating auxiliary agent.

8. Method of producing refrigeration through the agency of an absorption system which includes expelling a cooling agent from solution in an absorption liquid, converting the cooling agent to liquid phase, evaporating the cooling agent in the presence of an auxiliary agent, absorbing the cooling agent in the absorption liquid, circulating the auxiliary agent between the place of evaporation and the place of absorption, circulating the absorption liquid between the place of absorption and the place of expelling, and varying the relative proportions of circulating fluids by automatically withdrawing cooling agent from the active circulatory portion of the system and condensing and storing the same in varying amounts dependent on variations in load and returning the same thereto at a rate different from the rate of withdrawal, and automatically withdrawing auxiliary agent from the active circulatory portion of the system in varying amounts dependent on variations in load and returning the same thereto at a rate different from the rate of withdrawal.

9. Method of producing refrigeration through the agency of an absorption system which includes expelling a cooling agent from solution in an absorption liquid, converting the cooling agent to liquid phase, evaporating the cooling agent in the presence of an auxiliary agent, absorbing the cooling agent in the absorption liquid, circulating the auxiliary agent between the place of evaporation and the place of absorption, circulating the absorption liquid between the place of absorption and the place of expelling, and automatically varying the relative proportions of circulating fluid by sometimes simultaneously withdrawing cooling agent from the active circulatory portion of the system and condensing and accumulating the same and adding to the quantity of auxiliary agent in the circulatory portion of the system and, at other times withdrawing auxiliary agent from the active circulatory portion of the system and adding to the quantity of cooling agent in the active circulatory portion of the system.

10. That improvement in the art of refrigeration by the aid of a system of the absorption type employing an auxiliary agent into which a cooling agent evaporates which consists in increasing the effective condensation surface for the cooling agent on increase of external temperature, and separately accumulating the cooling agent condensed due to such increase of condenser surface.

11. That improvement in the art of refrigeration by the aid of a system of the absorption type employing an auxiliary agent into which a cooling agent evaporates which consists in increasing the effective surface for condensation of the cooling agent when the external temperature rises, separately accumulating the cooling agent condensed due to such increase of surface of condensation, and conducting such accumulated cooling agent into the presence of absorption liquid externally of the path of flow of liquid cooling agent to the evaporator.

12. That improvement in the art of refrigeration by the aid of a system of the absorption type employing an auxiliary agent into which a cooling agent evaporates which consists in increasing the effective surface of condensation for the cooling agent when the external temperature rises, separately accumulating the cooling agent condensed due to such increase of surface of condensation, and simultaneously adding auxiliary agent to the active circulatory portion of the system.

13. That improvement in the art of refrigeration by the aid of a system of the absorption type employing an auxiliary agent into which a cooling agent evaporates which consists in increasing the effective surface of condensation for the cooling agent when the external temperature rises, separately accumulating the cooling agent condensed due to such increase in surface of condensation, and utilizing the access of cooling agent to the increase of surface of condensation to force auxiliary agent from storage into the active circulatory portion of the system.

14. Refrigerating apparatus comprising a generator, a condenser, an absorber, an evaporator, conduits forming a circuit for circulation of absorption liquid between the generator and the absorber, a circuit for circulation of cooling agent through the generator, condenser, evaporator and absorber and a circuit for circulation of an auxiliary agent between the absorber and the evaporator, and members forming a path of flow for fluid between the condenser and the absorption liquid circulation circuit parallel to the evaporator including storage means for cooling agent in liquid phase and for auxiliary agent.

15. Refrigerating apparatus comprising a generator, a condenser, an absorber, an evaporator, conduits forming a circuit for circulation of absorption liquid between the generator and the absorber, a circuit for circulation of cooling agent through the generator, condenser, evaporator and absorber and a circuit for circulation of an auxiliary agent between the absorber and the evaporator, and members forming a path of flow for fluid between the condenser and the absorption liquid circulation circuit parallel to the evaporator including condensing surface and storage means for cooling agent in liquid phase and for auxiliary agent.

HARRY K. BERGHOLM.